United States Patent
Reese et al.

(10) Patent No.: US 11,072,836 B2
(45) Date of Patent: Jul. 27, 2021

(54) CHARGING DEVICE FOR THE HEAT TREATMENT OF WORKPIECES HAVING A HUB

(71) Applicant: Harterei Reese Bochum GmbH, Bochum (DE)

(72) Inventors: Gerhard Reese, Bochum (DE); Thorsten Stadtler, Bochum (DE)

(73) Assignee: HÄRTEREI REESE BOCHUM GMBH, Bocum (DE)

( * ) Notice: Subject to any disclaimer, the term of this patent is extended or adjusted under 35 U.S.C. 154(b) by 316 days.

(21) Appl. No.: 15/547,220

(22) PCT Filed: Feb. 3, 2016

(86) PCT No.: PCT/EP2016/052303
§ 371 (c)(1),
(2) Date: Jul. 28, 2017

(87) PCT Pub. No.: WO2016/124654
PCT Pub. Date: Aug. 11, 2016

(65) Prior Publication Data
US 2018/0023159 A1  Jan. 25, 2018

(30) Foreign Application Priority Data
Feb. 5, 2015  (DE) .......................... 102015101654.0

(51) Int. Cl.
*C21D 9/32* (2006.01)
*F27D 3/00* (2006.01)
(Continued)

(52) U.S. Cl.
CPC ................. *C21D 9/32* (2013.01); *C21D 9/34* (2013.01); *C21D 9/40* (2013.01); *F16D 1/0847* (2013.01); *F27D 3/0024* (2013.01); *F27D 5/00* (2013.01)

(58) Field of Classification Search
CPC ..................................... C21D 9/32; C21D 9/36
See application file for complete search history.

(56) References Cited

U.S. PATENT DOCUMENTS 1,704,327 A * 3/1929 Kenney .................... C21D 9/34
                                                    134/94.1
1,768,159 A * 6/1930 Shorter .................... C21D 9/32
                                                    266/125
(Continued)

FOREIGN PATENT DOCUMENTS

CN   202968640 U   *  6/2013
GB      227296 A   *  1/1925  ............... C21D 9/32
(Continued)

OTHER PUBLICATIONS

CN-202968640-U English language translation (Year: 2013).*

*Primary Examiner* — Anthony J Zimmer
*Assistant Examiner* — Sean P. O'Keefe
(74) *Attorney, Agent, or Firm* — Brooks Kushman P.C.

(57) ABSTRACT

A charging device for the heat treatment of workpieces being provided with a hub, comprising a charging support, a shaft and at least one auxiliary hub, wherein the workpiece can be vertically supported on the shaft by auxiliary hub(s) precisely fitted into the hub, and the shaft being supported by the charging support as well as use of auxiliary hubs for the dimensionally stable hardening of gear-wheels in vertical position.

8 Claims, 2 Drawing Sheets

(51) Int. Cl.
*F16D 1/08* (2006.01)
*F27D 5/00* (2006.01)
*C21D 9/40* (2006.01)
*C21D 9/34* (2006.01)

(56) References Cited

U.S. PATENT DOCUMENTS

| | | | |
|---|---|---|---|
| 2,067,549 A | | 1/1937 | Sykes |
| 2,524,044 A | * | 10/1950 | Denneen ............... C21D 9/32 266/126 |
| 3,160,429 A | * | 12/1964 | Martins ................. F16D 1/08 403/370 |
| 4,142,811 A | * | 3/1979 | Burnham ............. F16D 1/0864 403/290 |
| 6,030,471 A | | 2/2000 | Coles et al. |
| 2002/0045416 A1 | * | 4/2002 | Shia ..................... A46B 13/001 451/490 |
| 2009/0084470 A1 | * | 4/2009 | Kato ................... C21D 9/0025 148/225 |

FOREIGN PATENT DOCUMENTS

| | | | | |
|---|---|---|---|---|
| GB | 303196 A | * | 12/1928 | ............ C21D 9/32 |
| GB | 303196 A | | 12/1928 | |

\* cited by examiner

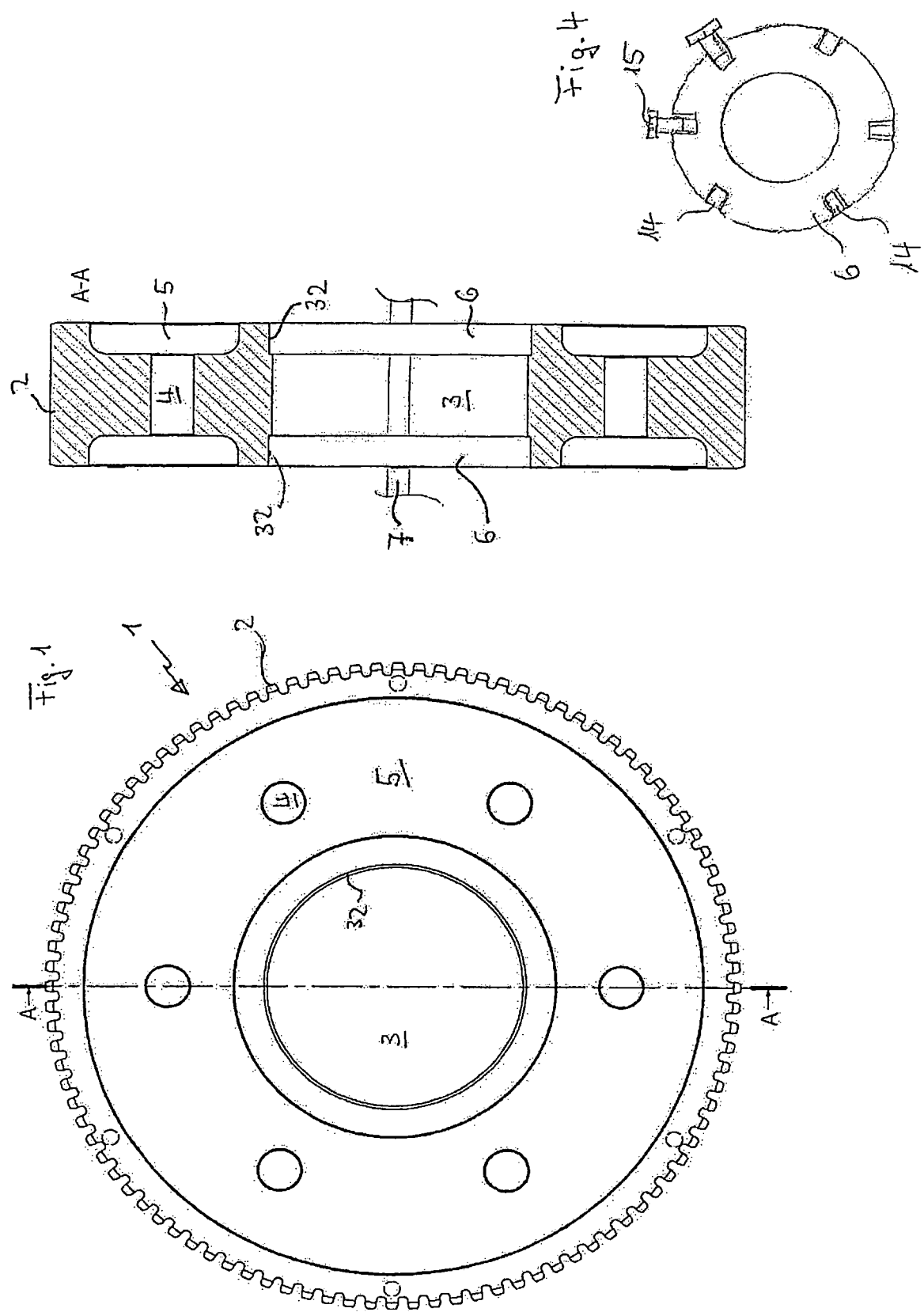

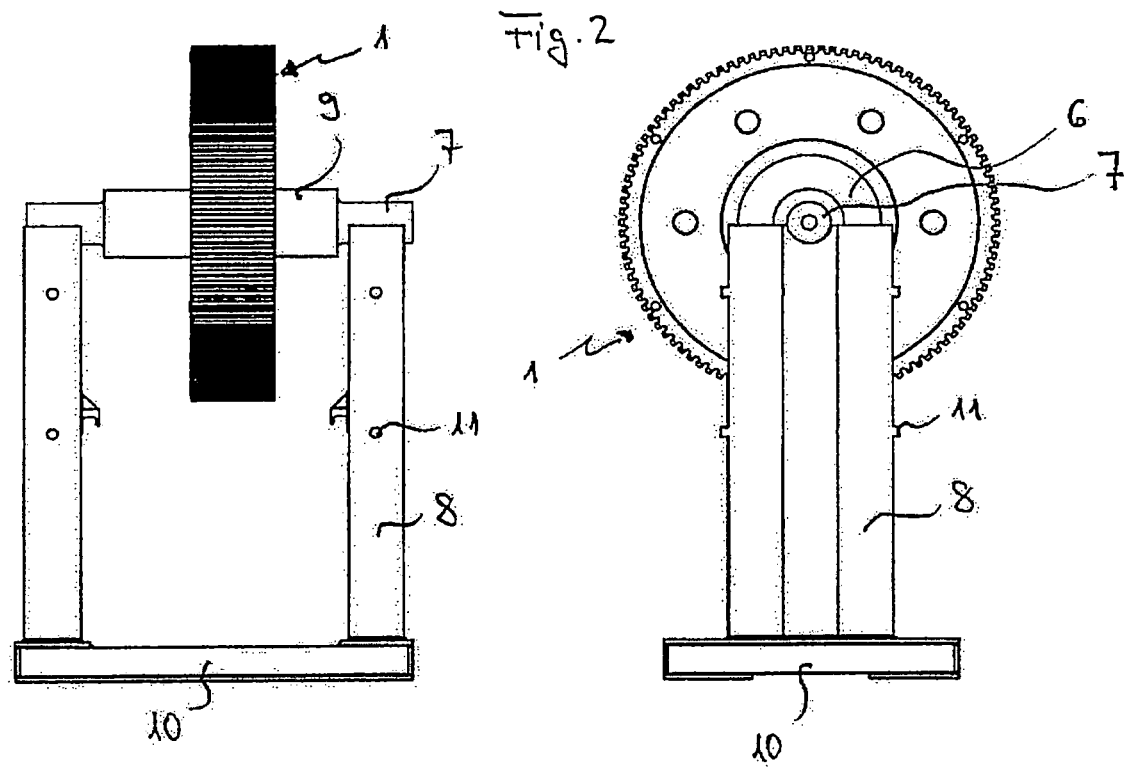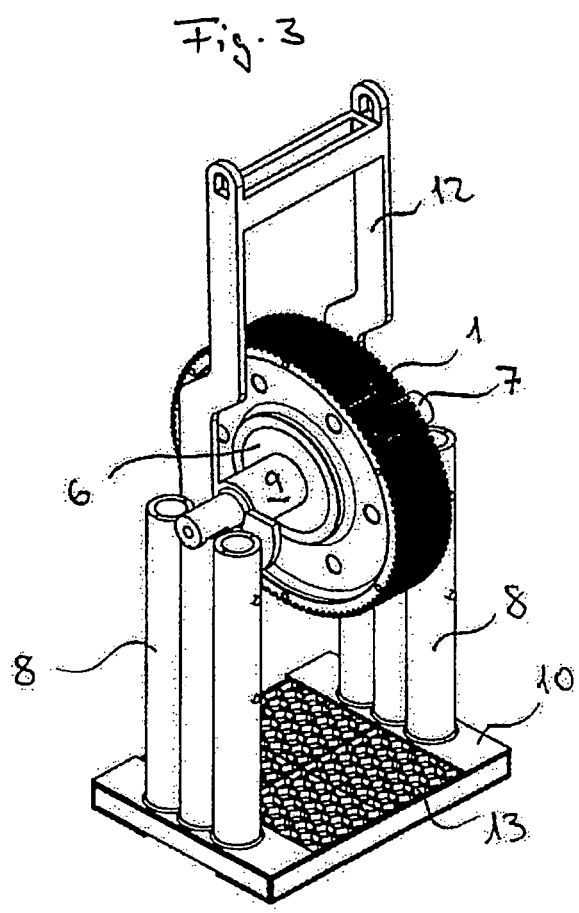

CHARGING DEVICE FOR THE HEAT TREATMENT OF WORKPIECES HAVING A HUB

The invention relates to a charging device for the heat treatment of workpieces having a hub, comprising a charging support, a shaft, and at least one auxiliary hub.

The heat treatment of workpieces made of steel (inter alia gearwheels) is aimed at improving the wear resistance and strength characteristics of the treated components. For this purpose, the workpieces are heated in furnaces to temperatures ranging between 700° C. and 1000° C. and when in austenitized state subjected to a quick quenching process. Quenching is usually effected using, for example, oil or polymer solutions as liquid quenching media.

During the process of subjecting the austenitized gearwheel to quenching in a liquid medium, said medium starts boiling at the hot workpiece surfaces causing a vapor layer to build up. This vapor layer, which is also known as vapor phase, greatly influences the cool-down rate of the workpiece. For that reason, emphasis has been on keeping the vapor phase to a minimum with a view to achieving a more uniform workpiece cooling. To some extent, this is accomplished by consistently recirculating the quenching medium and/or moving the workpieces within the quenching medium. After quenching, the workpieces are heated to temperatures within so-called tempering stages so that the required strength resp. hardness is brought about.

Gearwheels having outer diameters of below (approx.) 400 mm are as a rule positioned horizontally on standard charging racks and in this way subjected to the heat treatment process described above. However, in the event of gearwheels with outer diameters in excess of 400 mm the horizontal charging technique results in axial run-out and gearteeth suffering conical deformation. These deformation characteristics are on the one hand due to the selective support of the gearwheel on the charging rack and on the other hand the different quenching rates arising between the upper and lower planar surfaces of the gearwheel during the quenching process.

While the vapor within the quenching media is allowed to ascend from the top side of the gearwheel, large amounts of vapor develop at the underside of the gear-wheel and are prevented from escaping upwards which causes cooling down to decelerate on this side of the gearwheel. These different cooling down rates result in stresses arising within the gearwheel and are the reason for the deformation characteristics described hereinbefore. Axial run-out and taper of the gearteeth make it necessary to carry out intensive rework during final machining of the gearteeth that follows heat treatment. In unfavorable cases, the depth of hardness achieved through the heat treatment performed is machined down and thus diminishes to a great extent as a result of the mechanical rework necessitated by the deformation. In the worst case, deformation is so pronounced that even by mechanical reworking the gearwheel cannot be rendered useful for the intended purposes. Such gearwheels are to be considered rejects and must be scrapped. Because of the problematic situation described above it is common practice to charge gearwheels in vertically suspended position. For this purpose, the gear-wheel is suspended in its hub bore as a rule.

This method can only be adopted, however, if the geometry of the gearwheel allows this. In the event, the hub diameter of the gearwheel is greater than approx. 25% of its outer diameter there is a risk that the gearwheel suffers oval deformation during heat treatment. This deformation characteristic even becomes more significant with greater gearwheel diameters and weights. Ovality can hardly be reduced by resorting to mechanical rework and therefore is to be considered even more problematic than axial run-out or taper.

It is thus the objective of the invention to provide a device and a method by means of which the above described disadvantages can be avoided, in particular the occurrence of axial run-out and conically deformed gearteeth. At the same time, the device and the method shall enable the workpieces to be subjected to an efficient charging process and heat treatment.

This objective is accomplished with a charging device of the kind first mentioned above, wherein the workpiece can be vertically supported on the shaft via the auxiliary hub(s) precisely fitted into the hub, and wherein the shaft being supported on the charging support during the heat treatment.

The charging device proposed by the present invention is suited for all workpieces having a hub, and where the weight of the workpiece and the size of the hub may lead to or result in an undesirable deformation during heat treatment, in particular during hardening. The device is especially suited for the hardening of large gearwheels, that is of gearwheels having an outer diameter in excess of 400 mm, and the hub opening of which exceeding 20% of the outer gear diameter. Workpieces of this kind are particularly prone to suffer undesirable deformation during hardening due to their deadweight.

The charging device proposed by the invention basically comprises three components: a charging support, a shaft and at least one auxiliary hub. The auxiliary hub is mounted so as to fit precisely into the workpiece which enables the workpiece to be vertically supported on the shaft. During heat treatment, the shaft is supported by means of the charging support.

Expediently, two auxiliary hubs are fitted into the workpiece, said hubs either having a disk shape or a tapered configuration. In case of a disk shape configuration of the auxiliary hubs, the outer diameter of the disk coincides with the diameter of the workpiece hub. Auxiliary hubs of tapered or conical configuration are mounted into the hub from both sides in such a manner that the workpiece hub edges or rims are in contact with the outer surface of the two cones. Auxiliary hubs of tapered shape are self-adaptive. Disk-shaped auxiliary hubs have to be selected to suit the size of the workpiece hub or must be suitably adjusted to the relevant hub diameter of the workpiece via peripherally located adjusting elements. Suitable adjusting elements are screw adjusters for example.

Basically, the auxiliary hubs support the workpiece over their entire circumference. This rules out that during hardening the workpiece suffers oval deformation due to gravity. On the contrary, the workpiece in fixed position is stabilized in any direction.

The inventive charging device is primarily suited for handling workpieces that have a hub diameter of more than 20% of the workpiece diameter, with the workpiece diameter as a rule being larger than 400 mm. Moreover, it is of course possible as well to handle workpieces having an outer diameter of more than 2000 mm with hub diameters of 400 mm and above.

The components of the charging device usually consist of heat-resistant steel, with the hubs, for example, being made of structural steel or case-hardened steel.

To keep stresses acting on the shaft to a minimum it is expedient to make use of two disk-shaped auxiliary hubs, said auxiliary hubs can be designed in the form of spokewheels. The auxiliary hubs are peripherally fitted to both sides of the workpiece hubs and can be fixed in position on the shaft by means of tensioning elements. Another means of fixation is to use connecting braces/struts.

In the interest of applying heat uniformly it may be expedient to rotate the workpiece in the charging device. This can be done without difficulty via a driven shaft, wherein the shaft may be driven for example by means of a toothed gear system. A toothed gear system acting on the shaft offers advantages in that the workpiece attached to the shaft can be mounted on and taken out of the charging device quite easily.

The invention moreover relates to a method of hardening workpieces having a hub in a way to ensure their dimensional stability, in particular of gearwheels, in a charging device of the kind described hereinbefore. The method comprises the following steps Fitting of at east one auxiliary hub into the hub of the workpiece, suspension of the workpiece on a shaft in a charging support, with the workpiece being positioned vertically, applying heat to the workpiece, as the case may be under a protective inert gas or process gas shield, over a desired period of time, quenching the workpiece in a customary cooling medium and if required or expedient, tempering the workpiece.

It is considered expedient to drive the shaft with a view to achieving in this way that deformation, if any, of the workpiece is kept to an absolute minimum.

The invention finally relates to the use of auxiliary hubs for the dimensionally stable hardening of gearwheels in vertical position.

The implementation of the method initially requires the auxiliary hub construct with the shaft to be fitted into hub of the workpiece. Following this, the workpiece is lifted onto the charging support with the aid of a spreader and in this position subjected to the heat treatment process in the furnace for the usual period of time. Depending on the material, the heat treatment of workpieces as a rule takes place at temperatures of approx. 850° C. After heat-up and depending on the material and cross section of the workpiece, the heat treatment time amounts to several hours after which the workpiece is quenched and subsequently tempered/annealed with a view to achieving the desired strength/hardness. For case hardening, the temperature ranges between 930 and 980° C. Normally, a shielding gas is employed, in particular a carbon-containing protective gas. The duration of the heat treatment is in the usual range and may amount to 200 hours, depending on the desired case hardening depth. Case hardening also includes quenching of the workpiece, for example in an oil or polymer bath.

Making use of a charging device proposed by the invention and in accordance with the inventive method gearwheels of an outer diameter of 3200 mm have been successfully heat treated and hardened.

To meet individual requirements with respect to the reuse components, the auxiliary hubs may be made of plain structural steel or of a highly heat resistant steel grade. The auxiliary hubs are each fitted into the hub of the gearwheel from the outside, and in this way and due to their geometry they reduce the hub diameter via which the gearwheel is suspended for the heat treatment process. Accordingly, the gearwheel is supported via the installed auxiliary hubs that bring about a more uniform load distribution. In this manner, a deformation of the gearwheel that may cause axial run-out, taper, and ovality is kept to a minimum.

The invention is explained in more detail by way of the enclosed figures, where

FIG. 1 is a top view as well as cross-sectional view of a gear-wheel to be hardened in the way proposed by the invention:

FIG. 2 illustrates a view of an inventive charging device with suspended shaft and mounted gearwheel;

FIG. 3 depicts the charging device shown in FIG. 2 with attached spreader used for handling the gearwheel, and FIG. 4 shows an example of an adjustable auxiliary hub.

FIG. 1 illustrates a gearwheel that can be hardened as proposed by the invention, said gearwheel having a diameter of 2900 mm and a hub opening of 1080 mm. The gearwheel is provided with customary toothed rim 2 and a hub 3 as well as boreholes 4 equally distributed over the circumference. With a view to reducing the weight of the gear, boreholes 4 are located in an area of the gearwheel that is arranged deeper with respect to the toothed rim and the inner ring.

As can be seen from sectional view A-A (with auxiliary hubs and shaft), hub 3 has a central section 31 and two peripheral sections 32 that are slightly recessed with respect to the central section. These recesses serve to facilitate fitting of auxiliary hubs 6. The arrangement of recesses in this respect is helpful and improves the seat of auxiliary hubs 6, however the recesses are not essentially needed for the inventive method and the device proposed by the invention. Auxiliary hubs 6 are fitted into both peripheral sections 32 and may be connected with each other by means of struts or by means of tensioning elements fixed in position on shaft 7 of the device.

FIG. 2 shows an inventive charging device with suspended gearwheel 1 as a front and side view. Gearwheel 1 is mounted on shaft 7 by means of two auxiliary hubs 6 that are fitted on both sides into the outer sections 32 (see FIG. 1) of hub 3. The auxiliary hub disks 6 are precisely fit into the gearwheel hub 3, the shaft 7 is mounted into auxiliary hubs 6 with a precise fit.

Adjacent to auxiliary hub disks 6 shaft 7 is provided with tensioning elements 9 which on the one hand are fixed on shaft 7 and on the other keep auxiliary hubs 6 in their correct position.

Charging support 8 comprises on each side three adjacently arranged linear tubes the middle one of which is slightly shorter than the two outer tubes. Expediently, the middle tube is suitably rounded concavely at the top to enable shaft 7 to be accommodated. The tubes are securely interconnected by means of inserted connectors 11. A baseplate 10 serves as stand and may be designed as a grid in the central portion between the tubes to enable the gearwheel to be treated with hot air.

Basically, any form of charging support may be employed that has two pedestals/supports to carry the shaft.

FIG. 3 shows the charging device illustrated in FIG. 2 with gearwheel 1, shaft 7, support 8, baseplate 10 as well as a spreader 12 that serves to handle and transport the gearwheel 1 mounted on shaft 7. By means of spreader 12 the gear-wheel is mounted on the charging support, removed from it and inserted into the quenching bath. Spreader elements of this kind are customary lifting equipment.

Shaft 7 depicted in FIG. 2 and FIG. 3 may be designed in the form of a tensioning axle capable of fixing and preventing detachment of the auxiliary hubs arranged and fitted into the recessed sections 31 and 32 of gearwheel 1. For this purpose, the circumferential area of shaft 7 is made wider in the area adjacent to gear-wheel 1, said circumference being clamped against auxiliary hubs 6 and suitably secured to prevent slipping. It is to be understood that the auxiliary hubs may be of tapered/conical shape, wherein such cones/tapers on the shaft 7 are pushed against the hub 3 of gearwheel 1 thus causing the gearwheel to assume a centered position between them and are secured in this position on shaft 7.

FIG. 4 shows an auxiliary hub 6 that can be adjusted to suit the diameter of a gearwheel hub, said auxiliary hub having six peripheral tapped holes 14 into which bolts 15 are inserted so as to be adjustable in height. In the area of the gearwheel hub, auxiliary hub 6 via the heads of bolts 15 braces and supports itself against the gearwheel.

The invention claimed is:

1. Charging device for the heat treatment of workpieces provided with a hub (3), comprising a charging support (8), a shaft (7) and at least one auxiliary hub (6), wherein the workpiece (1) can be vertically supported on the shaft (7) by auxiliary hub(s) (6) wherein the shaft (7) is supported by the charging support (8), and
the auxiliary hubs are of disc shape and mounted onto the shaft with a precise fit, adjustable by at least six peripheral adjusting elements arranged so as to vertically support the workpieces on the shaft with said precise fit.

2. Charging device according to claim 1, characterized in that the workpiece (1) is a gearwheel.

3. Charging device according to claim 1, characterized in that the device is provided with two auxiliary hubs (6).

4. Charging device according to claim 1, characterized in that the workpiece (1) has a hub diameter of more than 20% of the workpiece diameter.

5. Charging device according to claim 1 made of heat resistant steel.

6. Charging device according to claim 1, characterized in that the shaft (7) is driven.

7. Charging device according to claim 1, characterized in that the charging support (8) is provided with two abutment structures.

8. Charging device of claim 1 wherein each of the peripherally arranged adjusting elements comprises one bolt or screw and one tapped hole therefor.

* * * * *